(12) United States Patent
Endoh et al.

(10) Patent No.: US 7,813,257 B2
(45) Date of Patent: Oct. 12, 2010

(54) OPTICAL RECORDING MEDIUM AND MASTER DISC FOR MANUFACTURING OPTICAL RECORDING MEDIUM

(75) Inventors: Sohmei Endoh, Tokyo (JP); Ayumi Konishi, Tokyo (JP)

(73) Assignee: Sony Corporation, Tokyo (JP)

( * ) Notice: Subject to any disclaimer, the term of this patent is extended or adjusted under 35 U.S.C. 154(b) by 742 days.

(21) Appl. No.: 10/239,188

(22) PCT Filed: Jan. 25, 2002

(86) PCT No.: PCT/JP02/00565

§ 371 (c)(1),
(2), (4) Date: Feb. 6, 2003

(87) PCT Pub. No.: WO02/059892

PCT Pub. Date: Aug. 1, 2002

(65) Prior Publication Data

US 2003/0152013 A1 Aug. 14, 2003

(30) Foreign Application Priority Data

Jan. 26, 2001 (JP) ............................... 2001-17992

(51) Int. Cl.
*G11B 7/24* (2006.01)
(52) U.S. Cl. .................................................. 369/275.4
(58) Field of Classification Search ............ 369/110.01, 369/110.02, 112.16, 112.17, 275.1, 275.3, 369/275.4, 47.19, 124.04
See application file for complete search history.

(56) References Cited

U.S. PATENT DOCUMENTS 4,788,421 A * 11/1988 Ogawa et al. ............ 369/44.11
4,893,298 A * 1/1990 Pasman et al. ............ 369/275.4
5,040,165 A * 8/1991 Taii et al. ................. 369/275.4
5,426,632 A * 6/1995 Murakami et al. ........ 369/275.4
5,724,339 A * 3/1998 Ogawa ..................... 369/275.1

(Continued)

FOREIGN PATENT DOCUMENTS

EP 0 414 429 A2 2/1991

(Continued)

OTHER PUBLICATIONS

Machine translation of Kuroda et al., JP 07-073509.*

(Continued)

*Primary Examiner*—Peter Vincent Agustin
(74) *Attorney, Agent, or Firm*—Oblon, Spivak, McClelland, Maier & Neustadt, L.L.P.

(57) ABSTRACT

An optical recording medium allowing high-density recording, where a groove having a shallow U-shaped cross section wider than certain width, a master for manufacturing optical recording medium, a manufacturing apparatus thereof, and a manufacturing method thereof are provided. A exposure beam (61) and a exposure beam (62) are recombined together with a first exposure beam (60) in a second PBS (47) so that traveling directions thereof may be the same direction. At this time, the exposure beam (61) and the exposure beam (62) are arranged so that both optical axes may be aligned at certain distance. Thereby, a width of a spot formed by combining these beams can be extended, and light exposure of the spot can be proper to form a shallow groove, as typically showed in FIG. 3.

8 Claims, 7 Drawing Sheets

U.S. PATENT DOCUMENTS

| | | |
|---|---|---|
| 6,335,916 B1 | 1/2002 | Endo et al. |
| 6,487,164 B1 | 11/2002 | Endoh et al. |
| 6,731,589 B2 * | 5/2004 | Sakamoto et al. ........ 369/275.4 |
| 2001/0030937 A1 * | 10/2001 | Sakamoto et al. ........... 369/277 |

FOREIGN PATENT DOCUMENTS

| | | |
|---|---|---|
| JP | 63-149846 | 6/1988 |
| JP | 3-80443 | 4/1991 |
| JP | 4-178932 | 6/1992 |
| JP | 5-189813 | 7/1993 |
| JP | 05-314543 | 11/1993 |
| JP | 5-314543 | 11/1993 |
| JP | 06-103613 | 4/1994 |
| JP | 6-274895 | 9/1994 |
| JP | 7-73509 | 3/1995 |
| JP | 07-169114 | 7/1995 |
| JP | 08-045116 | 2/1996 |
| JP | 09-245350 | 9/1997 |
| JP | 11-353656 | 12/1999 |
| JP | 2000-90496 | 3/2000 |
| JP | 2000-99999 | 4/2000 |
| JP | 2000-132869 | 5/2000 |
| JP | 2000-260070 | 9/2000 |

OTHER PUBLICATIONS

Machine translation of Taira et al., JP 05-314543.*

* cited by examiner

BACKGROUND ART

BACKGROUND ART

OPTICAL RECORDING MEDIUM AND MASTER DISC FOR MANUFACTURING OPTICAL RECORDING MEDIUM

TECHNICAL FIELD

The present invention relates to an optical recording medium, a master for manufacturing optical recording medium and an apparatus and a method for manufacturing the master for manufacturing the optical recording medium.

BACKGROUND ART

As an optical recording medium, various kinds have been proposed, for example, read-only type optical discs such as CD (compact disc) and LD (laser disc), and writable optical discs such as MO (magnetic optical disc) and MD (mini disc), in which a guide groove for tracking and a pattern for discrete information as a pre-format are preformed.

Manufacturing methods of such various optical discs generally include a step of manufacturing a metal master called a stamper which has a surface shape corresponding to a desired concavo-convex pattern of pits, a groove, and the like (a master manufacturing step), a step of molding for transferring the surface shape of the stamper onto a disc substrate, and a step of forming certain layers such as a recording layer and a protective layer.

Of these steps, in the master manufacturing step, a procedure of washing and drying a glass substrate having polished surfaces, applying photoresist, which is a sensitive material, on the glass substrate, and emitting the optical beams such as laser beams to the photoresist to form the pattern of the pits and the groove, is generally performed. A latent image formed on the photoresist by the above exposure is developed to form a concavo-convex pattern corresponding to the three-dimensional pattern of the pits or the groove on the photoresist, the pattern is further transferred onto a surface of a metal by the electroforming to produce the stamper. The procedure of recording the concavo-convex pattern using the exposure with such optical beams requires faithfully transferring certain pattern onto the photoresist surface in precision of the sub micron order.

On the other hand, a technique has been proposed for using a groove itself as a record track in the read-only type optical discs such as CD and LD and the rewritable type discs such as MD and MO. In these optical recording media, while the optimal pit width and the optimal groove width depend on the kinds of the media, and any of the masters for manufacturing optical recording medium are manufactured by the above master manufacturing methods, so the pit width and the groove width are defined by the spot diameter of the exposure beams.

Figure 5:
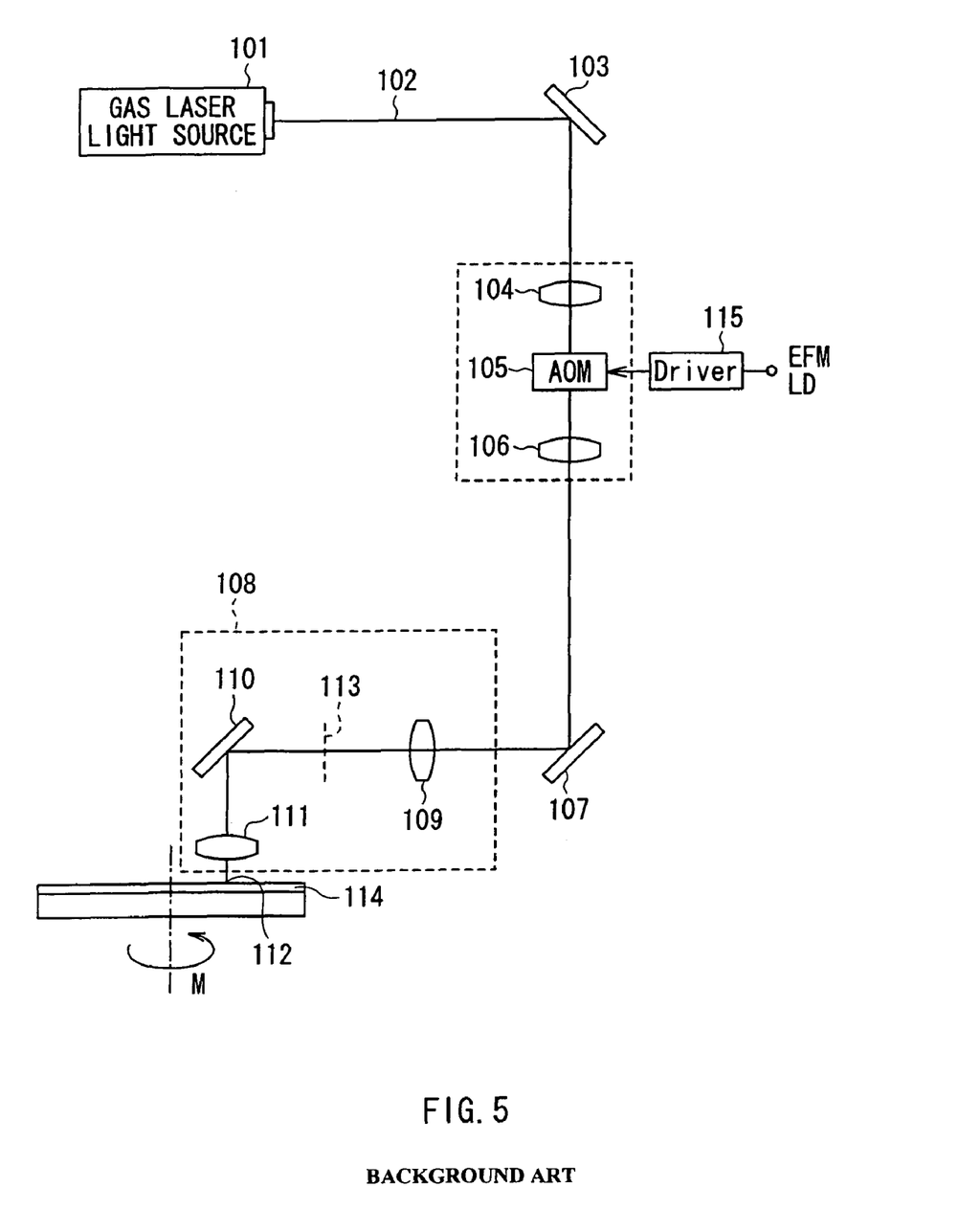
FIG. 5 is a view showing a schematic structure of a conventional aligner for recording a pattern of pits and the like of an optical recording medium such as CD or LD with single exposure beam.

An aligner having a schematic structure as shown in FIG. 5 has conventionally been used for recording on the optical recording media like CD and LD using one exposure beam. The aligner comprises a gas laser light source 101 which uses gas as an amplification medium like a He-Cd laser, a mirror 103 which leads a laser light 102, which is emitted from the gas laser light source 101, towards a latter optical system, a beam condenser 104 which condenses (reduces) the laser light 102 being led through the mirror 103, an AOM (Acousto Optical Modulator) 105 which modulates the optical intensity of the beam being controlled by a driver 115 corresponding to ultrasonic waves modulated and supplied based on record signals, a beam-diameter regulation lens 106 which enlarges or reduces the beam diameter of the laser light 102 being intensity-modulated by the AOM 105, a moving optical table 108, and a mirror 107 which reflects the beam, which is emitted from the beam-diameter regulation lens 106 and goes straight in a form of a collimated beam, and horizontally passes it onto the moving optical table 108.

Furthermore, on the moving optical table 108 are arranged a third lens 109, a mirror 110, and an objective lens 111. The third lens 109 is arranged in a position which makes the beam of the laser light 102 gather on an incident side condensing surface 113 which is formed in a position conjugated with an imaging condensing surface 112 of the objective lens 111. An exposure beam is directed to a photoresist film 114 via the third lens 109 of the moving optical table 108, the mirror 110, and the objective lens 111.

In addition, the spot diameter of the exposure beam can be adjusted by changing a focal distance of the beam-diameter regulation lens 106 or the third lens 109 being positioned between the gas laser light source 101 and the objective lens 111, and further readjusting an effective numerical aperture NA of the objective lens 111 so that the objective lens 111 may condense the exposure beam on a surface of the photoresist film 114.

Figure 6:
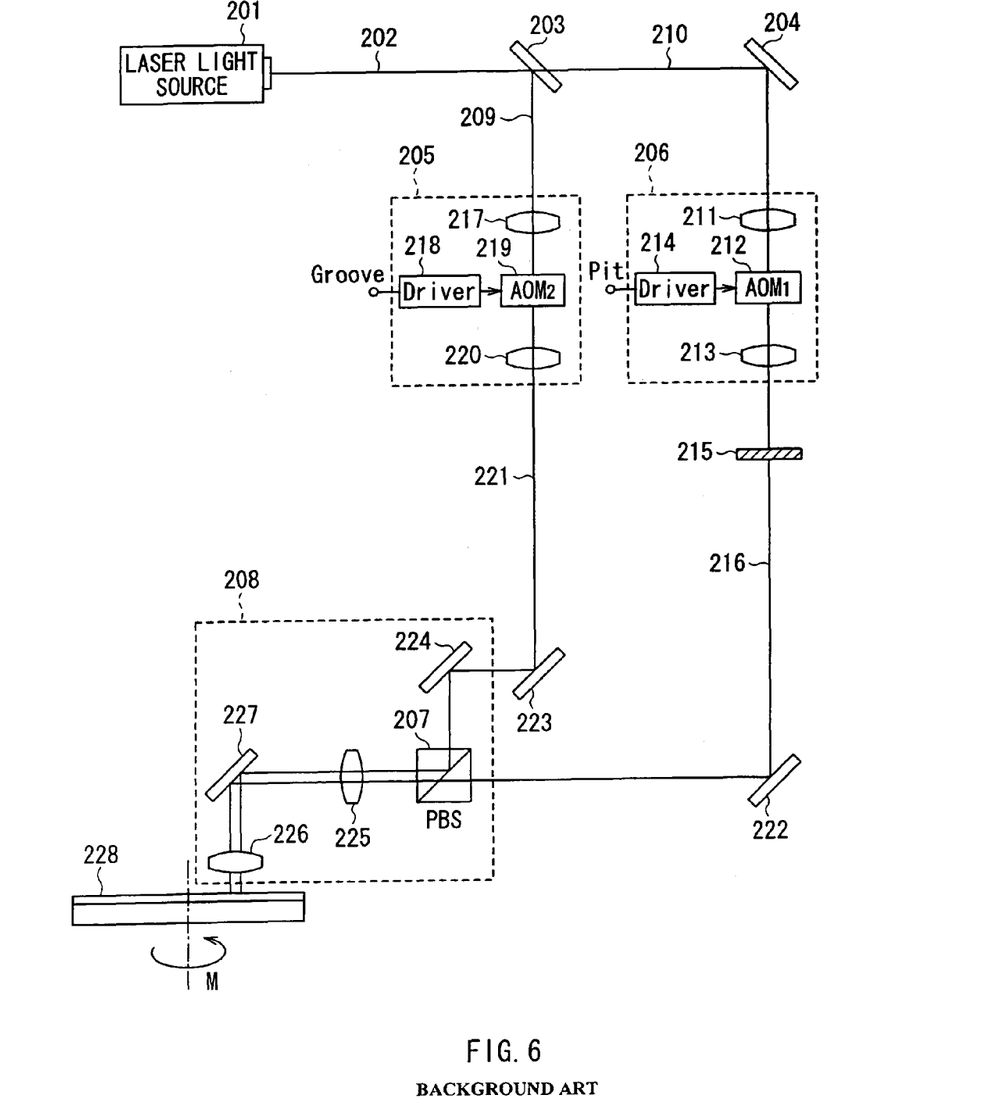
FIG. 6 is a view showing a schematic structure of a conventional aligner for recording pits and a groove with two exposure beams.

On the other hand, for example, in the MO discs, the technology of recording pits and a groove with two exposure beams has been proposed, for example, in Japanese Laid Open No. 06-103613. As shown in FIG. 6, in an optical recording apparatus, on the same optical axis are arranged one laser light source 201, a beam splitter 203 which divides a beam of laser light 202 being emitted from the laser light source 201 into two beams, a reflective mirror 204, a beam relay optical system 205, a beam relay optical system 206, and a moving optical table 208 equipped with a PBS (polarization beam splitter) 207 which regenerates the two divided laser beams.

The laser light 202 being emitted from the laser light source 201, goes straight keeping a form of a collimated beam, and is divided into reflected light (S polarized light) 209 and passing light (S polarized light) 210 by the beam splitter 203. The passing light 210 is reflected from the reflective mirror 204 and directed onto the beam relay optical system 206, and the reflected light 209 is directly led to the beam relay optical system 205. The passing light 210 is condensed on a first AOM 212 with a condenser lens 211 within the beam relay optical system 206. The first AOM 212 is controlled by a driver 214 and modulates the intensity of the beam of the passing light 210. The beam which is intensity-modulated by the first AOM 212 is reflected from a lens 213 to become a collimated beam of P polarized light. The collimated beam is polarized by a λ/2 polarizing plate 215 to become a collimated beam 216 of S polarized light.

On the other hand, the reflected light 209 becomes a collimated beam 221 of S polarized light through the beam relay optical system 205 comprising a condenser lens 217, a driver 218, a second AOM 219, and a lens 220.

The collimated beam 216 is reflected from a mirror 222, the collimated beam 221 is reflected from a mirror 223, and both are horizontally directed to the moving optical table 208 in parallel. In the moving optical table 208, the collimated beam 216 passes directly through the PBS 207. On the other hand, the collimated beam 221 is reflected from a mirror 224 to shift the traveling direction 90 degrees away from the original direction to be directed to the PBS 207, reflected inside the PBS 207, and aligned on the optical axis of an objective lens 226 through a lens 225 and a reflective mirror 227. As described above, the two collimated beams 216 and 221 which enter the PBS 207 are combined with the PBS 207. Here, a reflective surface of the PBS 207 is set so that the traveling direction of the combined and emitted laser beams may have a moderate angle of reflection. Thus, when the laser beams being emitted from the PBS 207 are condensed on a surface of a photoresist film 228 which is an exposed object and is parallel to an imaging condensing surface of the objective lens 226, spots of the two collimated beams 216 and 221 can be condensed respectively in positions which are shifted on the order of sensitivity and resolution of the photoresist film 228 and pits are exposed in the nearly center between adjacent parts of the groove in the radius direction.

Using such exposure method, a latent image of pits and a groove based on MO formats can be exposed (recorded). Furthermore, a latent image of pits and a groove based on various formats such as single density MO, double density MO, and quad density MO can be exposed (recorded) by changing focal distances of the condenser lenses 211 and 217 and the lens 225, readjusting so that the objective lens 226 may condense beams on the surface of the photoresist film 228, and changing the diameter of the spots of the exposure beams.

Incidentally, it is confirmed that there is possibility that pits with an U-shaped cross section and wobbling grooves shallower than the depth of the pits may become a leading technology corresponding to increased high density for realizing increasing the storage capacity thereof in optical recording media such as DVD-RW (digital versatile disc-rewritable) upon which practice of high density recording is imposed. DVD are generally set to perform recording on flat parts which can secure predetermined amounts of record signals, for example, on the bottoms of the grooves and on the upper surfaces of lands, and it is confirmed that effective recording and reproduction of information are possible, even if recording parts are located in a comparatively shallow position.

Figure 7:
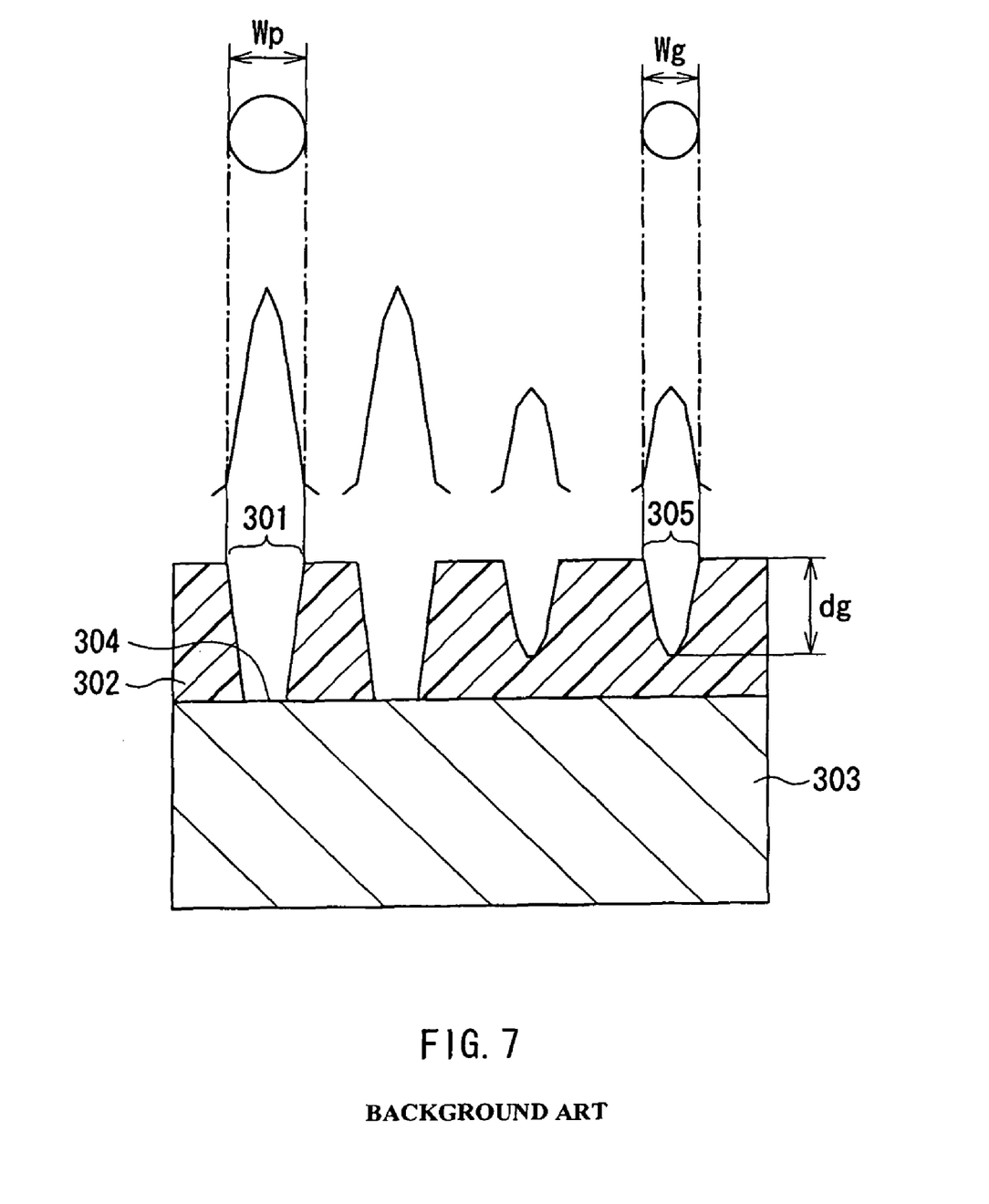
FIG. 7 is a view typically showing a glass master manufactured by a conventional technique.

When such master for manufacturing optical recording medium is produced, pits 301 are exposed so that espousing light for a photoresist film 302 may be deep enough to reach even a surface of a substrate 303 as typically shown in FIG. 7, so the cross section thereof has a U-shaped deep hole with a flat bottom 304.

However, in order to form a groove 305 shallower than the pits 301, light exposure for exposing the photoresist film 302 is purposely reduced to stop the exposing at a shallow place on the way without extending to a deep position in the thickness direction of the photoresist film 302 during producing the master for manufacturing optical recording medium, but a three-dimensional pattern of the shallower groove 305 obtained by developing a latent image formed with such lowered exposure light has a cross section of a V-shaped groove, and the width Wg of the groove 305 (the width in the radius direction of the disc-like substrate 303) narrows down to half or less of the width Wp of the pits 301, which results in a problem that sufficient amounts of servo signals (amounts of PUSH-PULL signals) at the time of reproduction or the like of the optical recording media manufactured from such master can not be obtained. Moreover, the V-shaped cross section of the groove 305 increases deviation (dispersion) of distribution of the depth dg of the groove, which results in a problem that recording and reproduction properties are lowered. Moreover, in the manufacturing process of the optical recording medium, laminating and forming furthermore a reflective film, a protective layer, and the like on a surface of the shallow groove with the V-shaped cross section can further reduce the substantial width of the groove 305.

And, in order to solve these problems, it is considered that there is also a method of increasing the light exposure to obtain certain width in the step of exposing the shallow groove 305 which is the factor thereof, but such increase of light exposure makes the exposure reach a deep position in the thickness direction of the photoresist film 302, and it is significantly difficult to form the groove 305 having the U-shaped cross section with certain width and shallower than the pits 301 in the conventional technique, for example, it is impossible to form even the groove 305 shallower than the pits 301.

The present invention has been achieved in view of the above problems. It is an object of the invention to provide an optical recording medium enabling high density recording, where a groove having U-shaped cross section being shallower than pits and the like and being wider than certain width is formed, a master for manufacturing optical recording medium, a manufacturing apparatus for manufacturing the master and a manufacturing method thereof.

DISCLOSURE OF THE INVENTION

An optical recording medium according to the present invention has a groove and plural pits formed and arranged dispersedly in a circumference direction, which are formed on a substrate with a shape such as a disc shape or a polygon, and the groove is formed to have a U-shaped cross section which is shallower than a depth of the pits.

A master for manufacturing optical recording medium according to the present invention where a groove and plural pits formed and arranged dispersedly in a circumference direction, are formed on a substrate, wherein the groove of the optical recording medium is formed to have a U-shaped cross section which is shallower than a depth of the pits.

An apparatus for manufacturing a master for manufacturing optical recording medium according to the present invention where a groove and plural pits formed and arranged dispersedly in a circumference direction, are formed on a substrate, comprises: a first beam splitter for dividing single exposure beam supplied from a light source into two beams; a pit modulation means for form the pit-modulating one beam of the divided beams; a pit exposure means for forming a latent image for forming the pits by irradiating a surface of the master with the pit-modulated beam; a wobble deflecting means for optically deflecting the other beam of the divided beams for wobbling; a second beam splitter for dividing the beam, which is optically deflected for wobbling, into plural exposure beams; and a groove exposure means for forming a latent image for forming a groove with an U-shaped cross section and shallower than a depth of the pits on the surface of the master by arranging the plural exposure beams to be aligned at certain widths in the radius direction of the master with a polarization beam splitter and irradiating an exposure beam with a spot wider in the radius direction of the master than that of the above single exposure beam to the surface of the master.

Moreover, another apparatus for manufacturing a master for manufacturing optical recording medium according to the present invention having at least a groove on a substrate, comprises: a wobble deflecting means for optically deflecting single exposure beam supplied from a light source for wobbling; a beam splitter for dividing the deflected beam into plural exposure beams; and a groove exposure means for forming a latent image for forming a groove with an U-shaped cross section on a surface of the master by arranging the plural exposure beams to be aligned at certain widths in the radius direction of the master with a polarization beam splitter, and irradiating an exposure beam with a spot wider in the radius direction of the master than that of the above single exposure beam to the surface of the master.

A method of manufacturing a master for manufacturing optical recording medium according to the present invention where a groove and plural pits formed and arranged dispersedly in a circumference direction, are formed on a substrate, wherein a single exposure beam supplied from a light source is divided into two beams with a first beam splitter, one beam of the divided beams is pit-modulated and irradiated to a surface of the master to form a latent image for forming the pits, the other beam of the divided beams is optically deflected for wobbling, and divided into plural exposure beams with a second beam splitter, and the plural exposure beams are arranged to be aligned at certain widths in the radius direction of the master with a polarization beam splitter and an exposure beam with a spot wider in the radius direction of the master than that of the above single exposure beam is irradiated to the surface of the master in order to form a latent image for forming a groove with an U-shaped cross section on the surface of the master.

Moreover, another method for manufacturing a master for manufacturing optical recording medium according to the present invention having at least a groove on a substrate, wherein a single exposure beam supplied from a light source is optically deflected for wobbling and divided into plural exposure beams with a beam splitter, the plural exposure beams are arranged to be aligned at certain widths in the radius direction of the master with a polarization beam splitter, and an exposure beam with a spot wider in the radius direction of the master than that of the above single exposure beam is irradiated to a surface of the master in order to form a latent image for forming a groove with an U-shaped cross section on the surface of the master.

In an optical recording medium, a master for manufacturing optical recording medium, and an apparatus and method for manufacturing a master for manufacturing optical recording medium according to the present invention, a latent image for forming a groove with an U-shaped cross section is formed on the master for manufacturing optical recording medium by optically deflecting for wobbling on single exposure beam supplied from the light source, dividing the optically deflected beam into the plural exposure beams, arranging the plural exposure beams to be aligned at certain widths in the radius direction of the master, and irradiating the exposure beam with a spot wider in the radius direction of the master than that of the above single exposure beam to the master. The latent image is developed to obtain the master for manufacturing optical recording medium having an original form of the groove with the U-shaped cross section. And the optical recording medium having the groove where the depth is shallower than the depth of the pits and the cross section thereof is formed to be U-shaped is manufactured using the master.

In addition, the shape of the cross section of the above groove is preferably to be the U-shaped groove with a ratio of a bottom width to an aperture width in set to 17% or more. It should be noticed that the ratio of the bottom width to the aperture width of the U-shaped groove is not limited only to this, but may be set to less than 17% depending on formats of optical recording media.

Moreover, if $\lambda$ is defined as wavelength of light for reproducing (reading) or for recording (writing), it is desirable to set the depth of the pits to $\lambda/4$ and to set the depth of the groove to $\lambda/8$, and this is not to say that it is not limited only to these.

A groove obtained by irradiation of one exposure beam in the conventional case has a bottom which is substantially not flat and a V-shaped or V shaped valley-like cross section. In any case, according to the optical recording medium of the present invention, the cross section form of the groove can be the U-shape, and the bottom of the groove can substantially be flat by arranging the plural exposure beams to be aligned at certain widths in the radius direction of the master, and irradiating the exposure beam with a spot wider in the radius direction of the master than that of the above single exposure beam to the master, as described above. The width of the flat bottom can be set and changed to various values, for example, 17% or more to the aperture width as described above, by adjusting intervals among center axes of the plural exposure beams. Moreover, the number of the beams arranged in the radius direction of the master can be set to two, three, or much more if needed.

Other and further objects, features and advantages of the invention will appear more fully from the following description.

BEST MODE FOR CARRYING OUT THE INVENTION

Embodiments of the present invention will be described in detail below with reference to accompanying drawings.

First Embodiment

Figure 1:
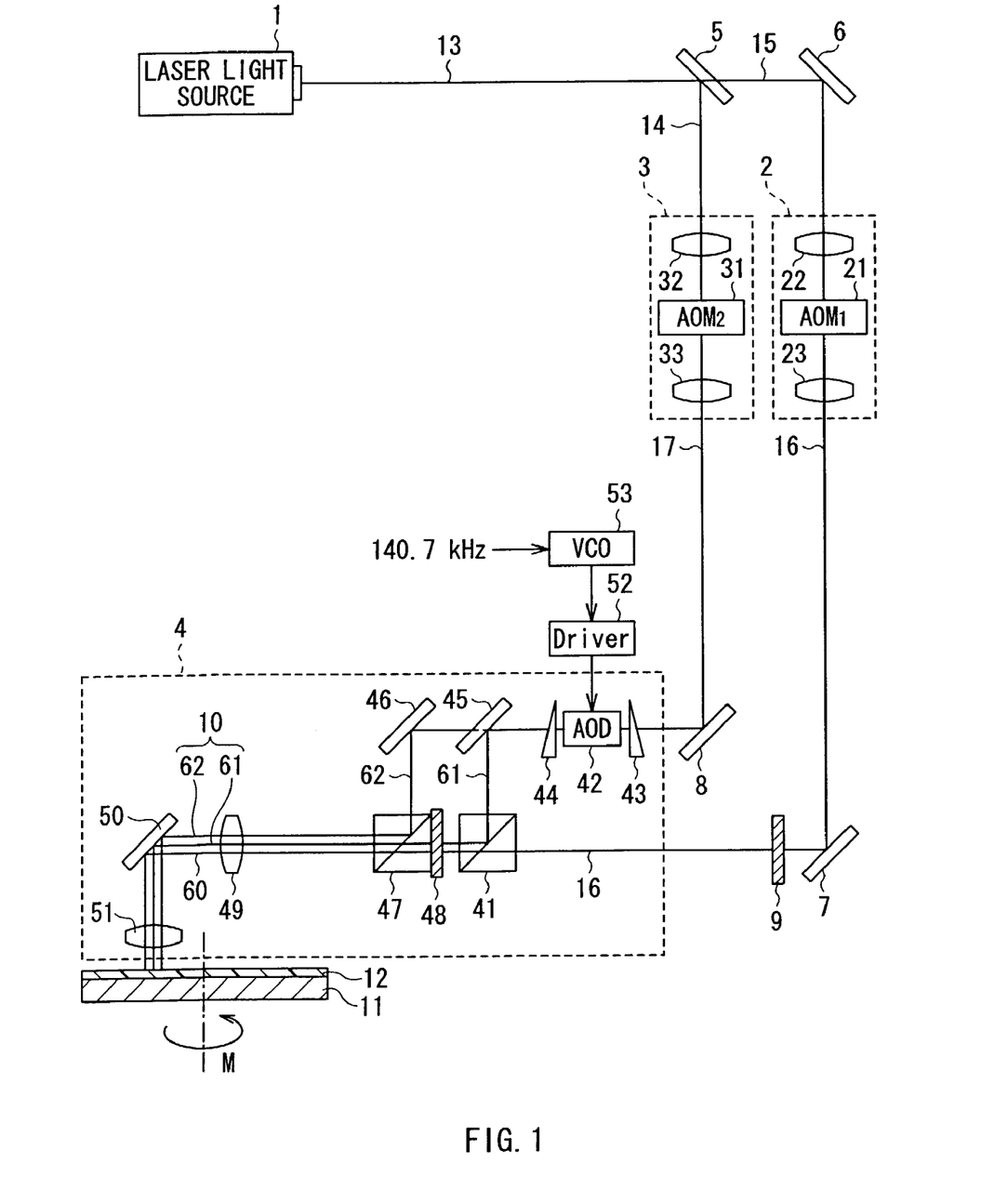
FIG. 1 is a view showing a schematic structure of an optical recording apparatus used in a step of manufacturing a master of an optical recording medium according to a first embodiment of the invention.

FIG. 1 is a view showing a schematic structure of an optical recording apparatus (a manufacturing apparatus for a master for manufacturing optical recording medium) used in steps of manufacturing a master for manufacturing optical recording medium according to a first embodiment of the invention. It should be noticed that, in an optical recording medium according to the embodiment, a main concavo-convex pattern is formed on the surface thereof, using the master produced by the optical recording apparatus, and principal parts of a method for manufacturing the master according to the embodiment is embodied by operations of the optical recording apparatus, so these will be also explained hereinafter.

The optical recording apparatus is used for forming a so-called stamper (a master for manufacturing optical recording medium) for transferring a desired concavo-convex pattern on a surface of a disc substrate in an optical disc manufacturing process, divides a laser beam 13 emitted from a laser light source 1 into two beams of a first exposure beam (a collimated beam 16) for exposing a pattern of pits and a second exposure beam (a collimated beam 17) for exposing a pattern of a wobbled groove (a wobbling groove) with a beam splitter 5, divides furthermore the second exposure beam into two exposure beams 61 and 62, arranges them at certain widths (intervals) in a radius direction of a round-plate-shaped master for manufacturing optical recording medium, irradiates a photoresist film 12 of the master for manufacturing optical recording medium with an exposure beam 10 with a wider spot extended in the radius direction, and forms a latent image to obtain the shallower wobbling groove with a U-shaped cross section after developing.

The optical recording apparatus comprises the laser light source 1, a first modulation optical system (it is called a first OM hereinafter) 2, a second modulation optical system (it is called a second OM hereinafter) 3, a moving optical table 4, and a $\lambda/2$ polarizing plate 9 as a principal part. Furthermore, on an optical axis through them, it comprises the beam splitter 5 and mirrors 6, 7, and 8 in order to lead the laser beam 13, and the exposure beam 10 may be set to be directed finally to the photoresist film 12 on a glass substrate 11 of the master.

As the laser light source 1, an apparatus for oscillating laser light for recording like a Kr laser ($\lambda$=351 nm) can suitably be used, for example. This is not to say that the laser light source 1 cannot be limited particularly to this and other apparatuses may suitably be selected and used.

The laser beam 13 emitted from the laser light source 1 goes straight keeping a form of a collimated beam, and is divided into reflected light (a beam 14) and passing light (a beam 15) by the beam splitter 5. The beam 14 reflected from the beam splitter 5 is directed on to the second OM 3. On the other hand, the beam 15 passing through the beam splitter 5 is reflected from a surface of the mirror 6 and is directed on to the first OM 2.

In the first OM 2, the beam 15 is condensed on a first AOM (Acousto Optical Modulator) 21 by a condenser lens 22. Laser light emitted therefrom which is intensity modulated by the first AOM 21 becomes the collimated beam 16 through a lens 23.

On the other hand, in the second OM 3, the beam 14 is condensed on a second AOM 31 by a condenser lens 32, and emitted laser light which is intensity modulated by the second AOM 31 becomes the collimated beam 17 through a lens 33.

The collimated beam 16 emitted from the first OM 2 is reflected from the mirror 7, becomes P polarized light through the $\lambda/2$ polarizing plate 9, and is horizontally directed to the moving optical table 4 in parallel. The collimated beam 17 emitted from the second OM3 is reflected from the mirror 8 and is horizontally directed to the moving optical table 4 in parallel.

The moving optical table 4 comprises a first PBS (polarization beam splitter) 41, an AOD (Acousto Optical Deflector) 42, wedge prisms 43 and 44, a beam splitter 45, mirrors 46 and 50, a second PBS 47, a $\lambda/2$ polarizing plate 48, a lens 49, and an objective lens 51 as a principal part. In addition, the AOD 42 is set to be driven and controlled by a VCO (Voltage Controlled Oscillator) 53 and a driver 52 based on timing signals of 140.7 kHz supplied from an external.

The collimated beam 16, which is emitted from the first OM 2 and led to reach the moving optical table 4, passes through the first PBS 41, the $\lambda/2$ polarizing plate 48 and the lens 49, is reflected from the mirror 50, is condensed on the objective lens 51, and is directed to the photoresist film 12 as the exposure beam to form the latent image of the pits.

On the other hand, the collimated beam 17 which is emitted from the second OM 3, after reaching the moving optical table 4, is optically deflected by the AOD 42, is reflected from the beam splitter 45 to bend the traveling direction by 90 degrees, and enters the first PBS 41. Moreover, the collimated beam 17, after passing through the beam splitter 45, is reflected from the mirror 46 to bend the traveling direction by 90 degrees, and enters the second PBS 47.

Incidentally, the AOD 42 performs the optical deflection on the collimated beam 17 so that the groove may be wobbled to become a wobbling groove. That is, the collimated beam 17 which is emitted from the second OM 3 and directed to enter the AOD 42, enters the AOD 42 through the wedge prism 43, and is optically deflected by the AOD42 in order to correspond to the exposure pattern. As acousto optical elements used for the AOD 42, a material made of tellurium oxide ($TeO_2$) is preferable, for example. The collimated beam 17 is emitted through the wedge prism 44 after the optical deflection thereof by the AOD 42. These wedge prisms 43 and 44 are set so that the collimated beam 17 may enter a lattice surface as the acousto optical elements of the AOD 42 satisfying the Bragg condition. Furthermore, they are also set not to change the horizontal height of the collimated beam 17, even when the AOD 42 performs the optical deflection on the collimated beam 17. In other words, the wedge prism 43, the AOD 42, and the wedge prism 44 are located so that the lattice surface of the acousto optical elements of the AOD 42 being subject to the collimated beam 17 satisfies the Bragg condition and that the horizontal height of the collimated beam 17 emitted from the AOD 42 may be not changed.

The AOD 42 is controlled by a driver 52. High frequency signals from a VCO 53 are supplied to the driver 52 with sin wave control signals. At the time of exposing a desired pattern, signals corresponding to the pattern are inputted from the VCO 53 into the driver 52, the AOD 42 is driven by the driver 52 based on the signals to perform the optical deflection on the collimated beam 17.

In detail, in the case of wobbling a groove with a frequency of 140.7 kHz in order to add address information on the groove, for example, signals which is obtained by phase modulation of high frequency signals with a center frequency of 224 MHz using control signals with a frequency of 140.7 kHz are supplied from the VCO 53 to the driver 52. Based on these signals, the driver 52 drives the AOD 42, the Bragg angle of the acousto optical elements of the AOD 42 is changed, and thereby, the optical deflection is performed on the collimated beam 17 corresponding to the wobbling with a frequency of 140.7 kHz.

The collimated beam 17, which is optically deflected by the AOD 42 to correspond to the wobbling of the wobbling groove in such a way, is reflected from the beam splitter 45 to bend the traveling direction by 90 degrees, and enters the first PBS 41 (the beam emitted therefrom is called a 2-1 exposure beam 61 for convenience, hereinafter), as described above. Moreover, the collimated beam 17 passing through the beam splitter 45 is reflected from the mirror 46 to bend the traveling direction at 90 degrees and enters the second PBS 47 (the beam emitted therefrom is called a 2-2 exposure beam 62 hereinafter).

Figure 3:
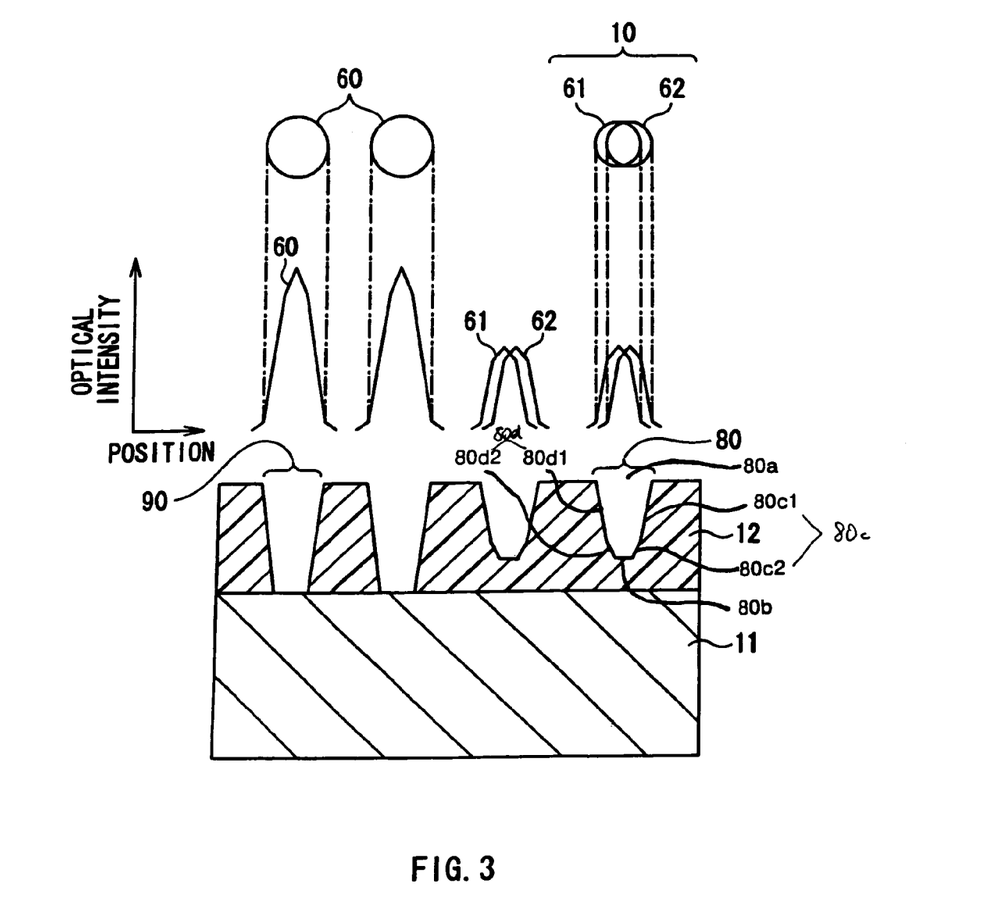
FIG. 3 is a view typically showing a glass master for manufacturing optical recording medium produced by the optical recording apparatus according to the first embodiment.

The 2-1 exposure beam 61 is reflected from the first PBS 41 and passes through the $\lambda/2$ polarizing plate 48 and the second PBS 47. The 2-2 exposure beam 62 is reflected from the second PBS 47. And the 2-1 exposure beam 61 and the 2-2 exposure beam 62 are recombined with the collimated beam 16 in the second PBS 47 to have the same traveling direction. At this time, the 2-1 exposure beam 61 and the 2-2 exposure beam 62 are arranged so that both optical axes thereof may be aligned at certain distance. As typically shown in the FIG. 3, the width of the spots formed by combining those beams can be extended, the light exposure of the beams can be adjusted to form shallow grooves. Consequently, the master, which has a wobbling groove three-dimensional pattern 80 for forming the wobbling groove with a shallow U-shaped cross section and a three-dimensional pattern 90 of pits, can be manufactured, and furthermore, the optical recording medium having the wobbling groove with the shallow U-shaped cross section can be manufactured using the master. The shallow U-shaped cross section of the three-dimensional pattern 80 has an open end 80a, a bottom 80b, and two opposing sides (80c and 80d). The two opposing sides (80c and 80d) of the cross section taper inwardly from the open end 80a to the bottom 80b. Each opposing side (80c and 80d) has respective first portions (80c1 and 80d1) tapering at a first angle from the open end toward the bottom 80b. The portions 80c1 and 80d1 transition to a corresponding second portion (80c2 and 80d2) which taper at a second angle toward the bottom 80b, the second angle being different from the first angle. As shown in FIG. 3, the second angle of the exemplary embodiment is smaller with respect to the first angle.

In addition, the collimated beam 16 is for exposing the pattern 90 of the pits after being emitted from the second PBS 47, so the beam at the second PBS 47 and forward is called an first exposure beam 60. The spot of the first exposure beam 60 for exposing the pits, after being recombined as described above, is arranged so that the optical axis thereof may be aligned at certain distance from the spot for the wobbling groove, as a distinct spot from the spot for the wobbling groove formed by combining the 2-1 exposure beam 61 and the 2-2 exposure beam 62.

The recombined 2-1 exposure beam 61 and 2-2 exposure beam 62 pass through the lens 49, which is a magnifying lens, to have certain beam diameters respectively, are reflected from the mirror 50 to be led to the objective lens 51, and are directed onto the photoresist film 12 through the objective lens 51. Thereby, the photoresist film 12 is exposed and the latent image is formed. At this time, the glass substrate 11 on which the photoresist film 12 is applied is driven by rotation drive using a rotation driving apparatus (not shown) as indicated by an arrow M in the figure so that the desired patterns 80 and 90 may be exposed on the whole surface of the photoresist film 12, and the position from the moving optical table 4 is relatively shifted in parallel. In such way, the latent image corresponding to irradiation tracings of the first exposure beam 60, the 2-1 exposure beam 61 and the 2-2 exposure beam 62, is formed on the almost whole surface of a predetermined recording range of the photoresist film 12. After developing the latent image, the optical recording medium based on the format, which is the suitable format for DVD-RW or the like and can realize high density recording, of the pits and the wobbling groove shallower than the pits and the U-shaped cross section, can be realized.

Here, the first PBS 41 and the second PBS 47 are set to reflect S polarized light and transmit P polarized light. Moreover, the collimated beam 16 emitted from the first OM 2 passes through the λ/2 polarizing plate 9 to rotate the polarizing direction by 90 degrees and become P polarized light, and further, the λ/2 polarizing plate 48 rotates the polarizing direction thereof to obtain P polarized light.

The collimated beam 17 which is optically deflected for wobbling by the AOD 42 is divided into the 2-1 exposure beam 61 and the 2-2 exposure beam 62 by the beam splitter 45 as described above, and they are recombined with the second PBS 47 so that the optical axes thereof may be aligned at certain intervals in parallel each other.

The 2-1 exposure beam 61 is S polarized light, and is reflected from the first PBS 41, the polarizing direction is optically rotated by the λ/2 polarizing plate 48, and a P polarized light component passes therethrough and enters the second PBS 47. Moreover, the 2-2 exposure beam 62 is S polarized light and is reflected from the second PBS 47, and at this time, is recombined to be in parallel with the 2-1 exposure beam 61 in the direction of the optical axis.

The 2-1 exposure beam 61 and the 2-2 exposure beam 62 which are recombined with the direction of the, optical axis can be arranged on the photoresist film 12 so that the optical axes thereof may be aligned at the certain intervals in the radius direction by changing the angle of the second PBS 47, and the transmitted light of the 2-1 exposure beam 61 can be adjusted by rotation adjustment of the λ/2 polarizing plate 48 to equalize the beam intensity.

In addition, for example, a numerical aperture NA of the objective lens 51 is preferably set to 0.9 in an example such as the above setting. Moreover, control signals from an input terminal which is not shown are supplied to the first AOM 21 and the second AOM 31. In the first AOM 21 for forming the pits, the control signals are EFM+(8-16 modulation) signals, and the laser light is intensity modulated (ON/OFF) by the EFM+signals. Moreover, in the second AOM 31 for forming the groove, DC signals with a fixed level are used.

Second Embodiment

Figure 2:
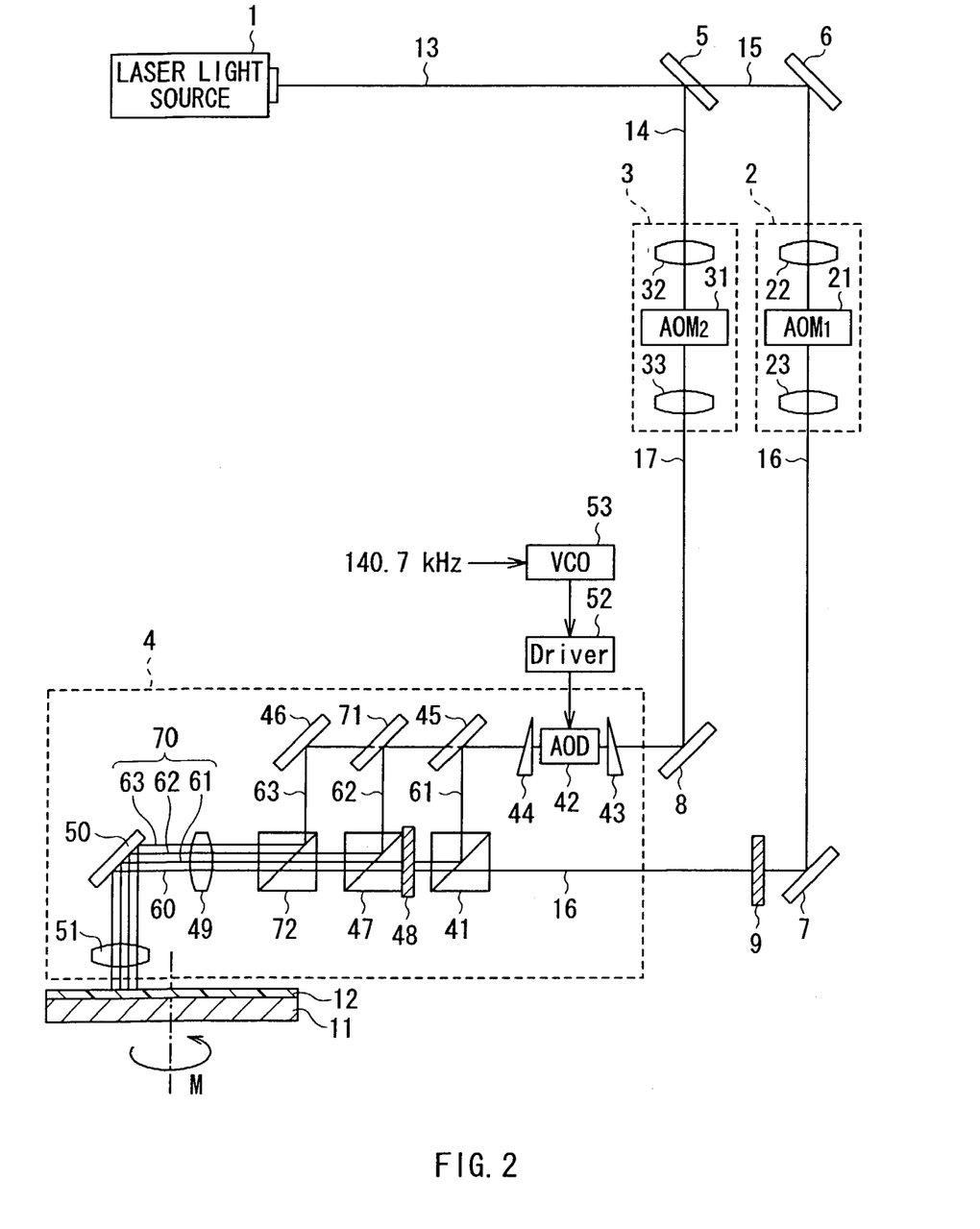
FIG. 2 is a view showing a schematic structure of an optical recording apparatus used in a step of manufacturing a master according to a second embodiment of the invention.

A second embodiment is obtained by furthermore changing the optical recording apparatus and the manufacturing method comprising the main step of exposing the master in the above first embodiment, where the collimated beam 17 which is the second exposure beam for exposing the pattern 80 of the wobbling groove is divided into three exposure beams (they are called the 2-1 exposure beam 61, the 2-2 exposure beam 62, and a 2-3 exposure beam 63) using beam splitters 45 and 71 and the mirror 46, and they are combined so that optical axes thereof may be aligned at certain intervals in the radius direction. Thereby, a spot width of an exposure beam 70 for finally directing to a photoresist and exposing a wobbling groove is extended, and a latent image of the shallow U-shaped wobbling groove is formed.

FIG. 2 is a view showing a schematic structure of an optical recording apparatus used in a step of manufacturing a master of an optical recording medium according to the second embodiment of the invention. In FIG. 2, in order to intend simplification of illustration and explanation thereof, the same parts as those indicated in FIG. 1 are denoted by the same symbol.

Figure 4:
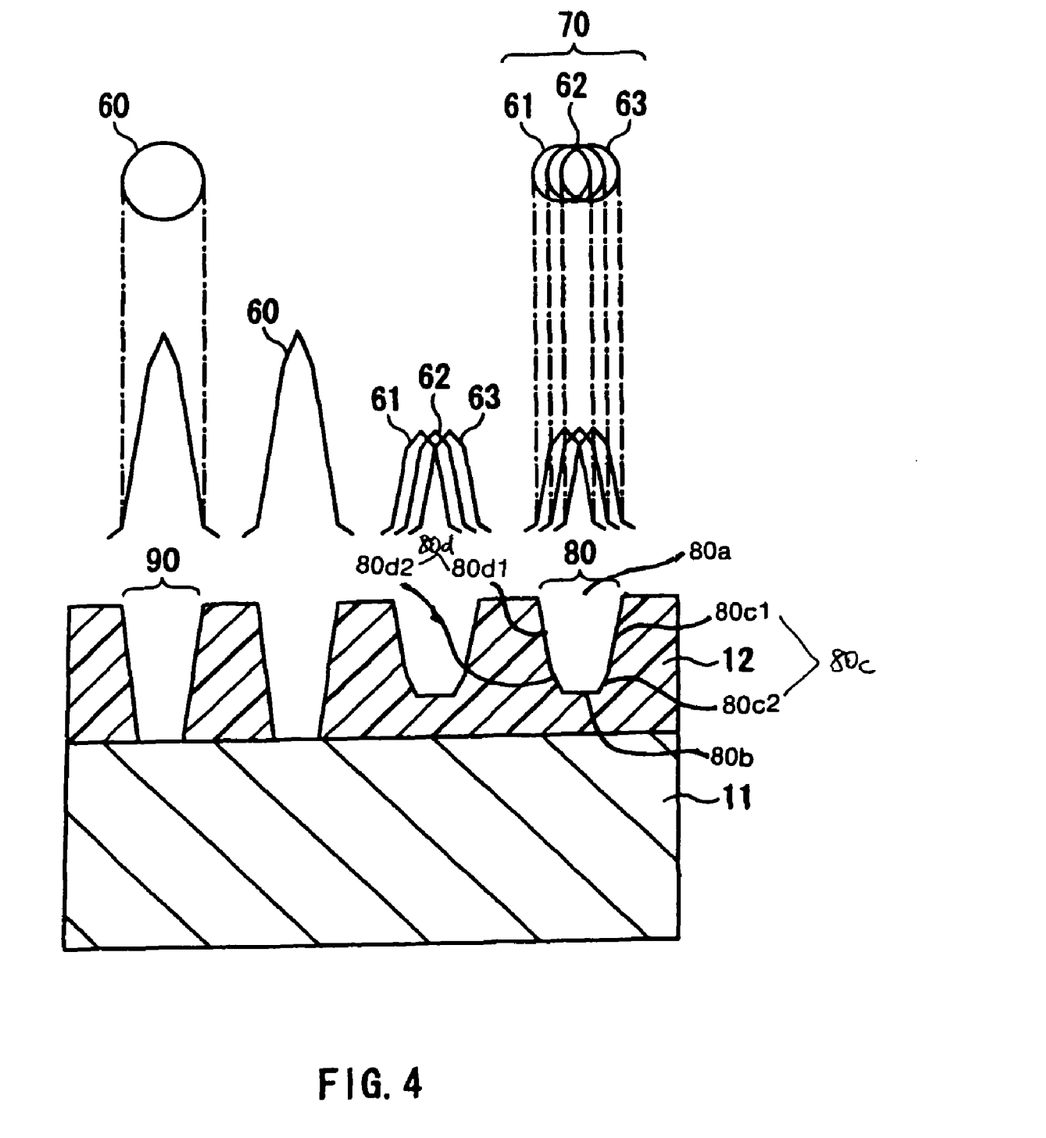
FIG. 4 is a view typically showing a glass master produced by the optical recording apparatus according to the second embodiment.

In the optical recording apparatus according to the second embodiment, the collimated beam 17 which is optically deflected by the AOD 42 for wobbling is divided into three beams of the 2-1 exposure beam 61, the 2-2 exposure beam 62, and the 2-3 exposure beam 63 by the beam splitter 45 and the beam splitter 71. The 2-1 exposure beam 61, the 2-2 exposure beam 62, and the 2-3 exposure beam 63 are recombined with the second PBS 47 and a third PBS 72 so that the optical axes thereof may be aligned at the certain intervals in the radius direction of the master, which results in forming the exposure beam having the wider spot and lowered light exposure in order to form the latent image of the three-dimensional pattern 80 of the shallow wobbling groove having a U-shaped cross section and a wider bottom as typically shown in FIG. 4, on the photoresist film 12.

The 2-1 exposure beam 61, which is the S polarized light, is reflected from the first PBS 41, is changed into P polarized light by rotating (optically rotating) the polarizing direction with the λ/2 polarizing plate 48, and passes therethrough, and the 2-2 exposure beam 62 and the 2-3 exposure beam 63, which are S polarized light, are reflected respectively from the second PBS 47 and the third PBS 72, and are recombined with the third PBS 72. A width of a spot formed by the recombination of the 2-1 exposure beam 61, the 2-2 exposure beam 62 and the 2-3 exposure beam 63 for irradiating the photoresist film 12, can be adjusted by changing the angles of the second PBS 47 and the third PBS 72. Moreover, the beam intensity can be equalized by adjusting the rotation of the λ/2 polarizing plate 48 to adjust transmitted light of the 2-1 exposure beam 61 through the first PBS 41 and the second PBS 47.

In such a way, the optical recording medium having the pits and the wobbling groove with the shallow U-shaped cross section, and the wide bottom, which is an optical recording medium based on a suitable format for DVD-RW or the like, can be realized. If requirements, for example, various exposure conditions such as wavelength of the laser beams and sensitization properties of the photoresist, and the depth on the wobbling groove, are the same as the case where the latent image of the wobbling groove is exposed by the combination of the two exposure beams as shown in the first embodiment, arranging and aligning the three exposure beams like the second embodiment or more exposure beams can provide the wobbling groove with the wider bottom compared with the above case, and also improve further the flatness of the bottom.

EXAMPLE OF THE METHOD OF MANUFACTURING THE OPTICAL DISC

Based on the method of manufacturing the optical disc as described in the above second embodiment, a master was actually manufactured and further an optical disc was manufactured using the master.

First, in the step of manufacturing the master, a master for manufacturing optical recording medium which has a three-dimensional pattern 80 corresponding to pits and a shallow U-shaped wobbling groove was produced using the optical recording apparatus according to the second embodiment.

In the step of manufacturing the master, first, a disc-like glass substrate 11 with polished surfaces was cleaned and dried, and then, a photoresist film 12 which was a sensitive material was applied on the glass substrate 11. The photoresist film 12 was exposed by the optical recording apparatus, and a latent image of the pits and the shallow U-shaped wobbling groove was formed on the photoresist film 12.

A Kr laser light source which emits laser light at a wavelength λ of 351 nm was used as the laser light source 1. A lens with a numerical aperture NA of 0.9 was used as the objective lens 51 for condensing the first exposure beam 60, the 2-1 exposure beam 61, the 2-2 exposure beam 62, and the 2-3 exposure beam 63 on the photoresist film 12. Moreover, a lens with a focal distance of 80 mm was used as the lens 49 for beam expansion.

When the photoresist film 12 is exposed using a laser cutting apparatus, the latent image of the deeper pits is formed on the photoresist film 12 by exposing the photoresist film 12 to the first exposure beam 60, and the latent image of the shallow U-shaped wobbling groove is formed on the photoresist film 12 by exposing the photoresist film 12 to the 2-1 exposure beam 61, the 2-2 exposure beam 62, and the 2-3 exposure beam 63. In addition, when the photoresist film 12 is exposed to form the latent image of the pits and the wobbling groove, the glass substrate 11 on which the photoresist film 12 is applied, is driven and rotated at certain rotation speed, and the moving optical table 4 is moved relatively in parallel with the photoresist film 12 at certain rate.

Specifically, the rotation speed of the glass substrate 11 was set so that a relative movement speed of the light spot of the first exposure beam 60 and the photoresist film 12 may become a linear velocity of 3.49 m/s, the moving optical table 4 was set to move relatively in the radius direction thereof in parallel with the glass substrate 11 by 0.74 μm (namely, one track pitch length) for every rotation of the glass substrate 11.

The optical intensity modulation by the second OM 3 and the optical deflection by the AOD 42 as described in the second embodiment is performed on the 2-2 exposure beam 62, when exposing the photoresist film 12 to the 2-2 exposure beam 62 to form the latent image of the wobbling groove having the shallow U-shaped cross section on the photoresist film 12. Here, the shallow U-shaped wobbling groove is continuous with certain depth, so the optical intensity modulation by the second OM 3 is continued so that the optical intensity of the collimated beam 17 may become constant during forming the latent image corresponding to the shallow U-shaped wobbling groove.

Then, the optical deflection was performed on the collimated beam 17 by the AOD 42. Specifically, in order to perform the optical deflection on the collimated beam 17, control signals, which are obtained by modulating high frequency signals based on timing control signals, are supplied from the VCO 53, which is the voltage controlled oscillator, to the driver 52, and the driver 52 drives the AOD 42 based on the control signals to change the Bragg angle as the acousto optical elements. In the example, the optical deflection was performed as follows: FM modulation was performed on high frequency signals having a center frequency of 224 MHz based on timing control signals having a frequency of 140.7 kHz to obtain the control signals; and, the driver 52 was controlled and driven by the VCO 53 based on the control signals, so that a combined spot of the exposure beam 70 condensed on the photoresist film 12 oscillated at a frequency of 140.7 kHz at ±10 nm oscillations in the radius direction of the glass substrate 11, and flat tracking of the pattern 80 of the groove exposed on the photoresist film 12 was wobbled.

The collimated beam 17, which is intensity modulated and optically deflected in such a way, is once divided into the three beams of the 2-1 exposure beam 61, the 2-2 exposure beam 62, and the 2-3 exposure beam 63 by the beam splitter 45 and the beam splitter 71, and further, these three beams were recombined with the second PBS 47 and the third PBS 72 so that their optical axes may be aligned at certain intervals in the radius direction of the glass substrate 11. The exposure beam 70 obtained by the recombination passes through the lens 49 to adjust the spot diameter, is reflected from the mirror 50 to change the traveling direction by 90 degrees, and is condensed on the photoresist film 12 by the objective lens 51. Thereby, the latent image corresponding to the wobbling groove with the shallow U-shaped cross section was formed on the photoresist film 12.

For exposing the photoresist film 12, the glass substrate 11 on which the photoresist film 12 was applied, was driven and rotated at certain rotation speed and moved in parallel at certain speed as described in the above embodiment. Specifically, the rotation speed of the glass substrate 11 was set so that the relative movement speed of the exposure beam 70 (in other words, of the moving optical table 4) and the photoresist film 12 may be a linear velocity of 3.49 m/s. Moreover, the moving optical table 4 was moved in parallel in the radius direction of the glass substrate 11 by every 0.74 μm corresponding to one track pitch for every rotation of the glass substrate 11.

In addition, the power of the first exposure beam 60 for recording the pits when exposing the photoresist film 12 was 2.0 mW, and the power of the collimated beam 17 which is the second exposure beam for recording the shallow U-shaped wobbling groove was 2.0 mW for using the two beams of the 2-1 exposure beam 61 and the 2-2 exposure beam 62 beams, or was 3.0 mW for using a total of three beams of the 2-1 exposure beam 61, the 2-2 exposure beam 62, and the 2-3 exposure beam 63. The setting in such a way can suitably adjust the desired width of the wobbling groove with the shallow U-shaped cross section, and adjusting the power of the exposure beams can reduce the depth thereof to be as shallow as half depth of the pits. However, the depth is not limited only to this but it is possible to be adjusted to a desired depth by variously changing the settings of the power of the exposure beams.

After forming the latent image on the photoresist film 12 in such a way, the glass substrate 11 was located on a turntable of a development machine (not shown) so that the surface on which the photoresist film 12 is applied may face up. And rotating the glass substrate 11 together with the turntable, a developer was dropped on the photoresist film 12 to perform the development, which formed the concavo-convex pattern corresponding to the deep pits and the wobbling groove having the shallow U-shaped cross section on the glass substrate 11.

Next, a conductive film made of nickel or the like was formed on the concavo-convex pattern by the electroless plating, and after that, the glass substrate 11 having the conductive film thereon was mounted in an electrocasting apparatus and a plating layer with a thickness of about 300±5 μm made of nickel or the like was formed on the conductive film by the electroplating process. Then, the plating layer was peeled, the peeled plating was cleaned using acetone or the like to remove the photoresist film 12 remaining on the concavo-convex pattern transferred surface.

This accomplished the master for manufacturing optical recording medium composed of the plating on which the concavo-convex pattern formed on the glass substrate 11 was transferred, i.e., the master on which the concavo-convex pattern corresponding to the deep pits and the shallow U-shaped wobbling groove. The master for manufacturing optical recording medium is used for manufacturing the optical disc where the wobbling groove with the shallow U-shaped cross section is formed to have a spiral shape along a recording track.

Next, a disc substrate on which the concavo-convex pattern of the surface of the above master was transferred was produced by the photopolymerization process (the so-called 2P process) as a transfer step.

Specifically, first, a photopolymer was smoothly applied on the surface on which the concavo-convex pattern of the master was formed, in order to form a photopolymer layer, and then a base plate was adhered thereon preventing bubbles and garbage from entering the photopolymer layer. As the base plate, a base plate made of polymethylmethacrylate refractive index thereof is 1.49) with a thickness of 0.6 mm was used.

Then, the photopolymer was hardened by ultraviolet irradiation, and furthermore the master was peeled from the photopolymer layer to obtain the disc substrate on which the shape of the surface of the master was transferred.

This is not to say that the disc substrate can be produced by the injection molding using a transparent resin such as polymethylmethacrylate or polycarbonate for mass producing the disc substrates, while the disc substrate was here produced using the 2P process to surely transfer the concavo-convex pattern which is formed on the master.

Next, as a deposition step, a recording layer and a protective layer were formed on the disc substrate on which the surface shape of the master was transferred. Specifically, first, a first dielectric film made of SiN or the like, a phase-change recording film made of a GeSbTe alloy or the like and a second dielectric film made of SiN or the like was sequentially formed on the concavo-convex pattern formed surface of the disc substrate by the sputtering, and furthermore a light reflecting film made of Al alloy or the like was formed on the second dielectric film, in order to form the recording layer composed of the first dielectric film, the phase-change recording film, the second dielectric film, and the light reflecting film for example. Then, the protective layer was formed by applying an ultraviolet curing resin on the recording layer by the spin coat process, and irradiating the ultraviolet curing resin with ultraviolet rays to cure the resin. This accomplished the phase-change optical disc.

[Evaluation of the Manufactured Optical Disc]

Stampers, which are actually manufactured like the above example using the method of manufacturing the master as described in the first embodiment and the second embodiment, were measured using an AFM (Atomic Force Microscope) in the terms of a width and a depth of pits, and an aperture width, a bottom width, and a groove depth of a shallow U-shaped wobbling groove.

A stamper A was obtained by exposing a pattern 80 of a wobbling groove with the exposure beam 10 composed of the recombined two beams of the 2-1 exposure beam 61 and the 2-2 exposure beam 62, using the method described in the first embodiment. The results of measuring the stamper A were that the pits had a depth of 80 nm, an aperture width (upper width) of 320 nm and a bottom width (lower width) of 210 nm, and that the wobbling groove had an aperture width of 390 nm and a bottom width of 150 nm, and groove depths toward the bottom of 21 nm, 31 nm, and 42 nm by adjusting the power of the exposure beam 10.

A stamper B was obtained by exposing a wobbling groove with the exposure beam 70 composed of the recombined three beams of the 2-1 exposure beam 61, the 2-2 exposure beam 62, and the 2-3 exposure beam 63, using the method described in the second embodiment. The results of measuring the stamper B were that pits had a depth of 81 nm, an aperture width (upper width) of 320 nm and a bottom width (lower width) of 200 nm, and that the wobbling groove had an aperture width of 520 nm and a bottom width of 280 nm, and groove depths toward the bottom of 19 nm, 29 nm, and 39 nm by adjusting the power of the exposure beam 70.

Next, an optical disc A and optical disc B for evaluation were produced respectively using the stamper A and the stamper B as described above, and the evaluation thereof was performed.

Each of the optical disc A and the optical disc B was evaluated in terms of signal properties of pits and signal properties of a shallow U-shaped wobbling groove, using an optical pickup at a laser wavelength of λ=650 nm equipped with an objective lens with a numerical aperture of NA=0.65 as an evaluation machine. Push-pull signals were used for tracking.

Concerning to the pits, it was confirmed that it was possible to realize the signal properties of stable tracking and stable reproduction of the signals supported in the pits in the optical disc A and the optical disc B. Moreover, jitters of the optical disc A and the optical disc B were respectively 6.8% and 6.7%.

Concerning the wobbling groove, the bottoms of the shallow U-shaped wobbling grooves of the optical disc A and the optical disc B were formed to be wider as shown in the above example, and it was possible to obtain a sufficient amount of the push-pull signals, which reveals that it was possible to stably reproduce the wobble signals in any groove with a depth in a range of 19-42 nm in the optical discs A and the optical discs B. Furthermore, jitters of the optical disc A and the optical disc B when recording and reproducing of the shallow U-shaped wobbling groove were respectively 7.3-7.8% and 7.1-7.5%, even if the depth of the wobbling groove was changed.

Thus, it was confirmed that the optical recording media, which has the format of the pits and the U-shaped wobbling groove shallower than the pits according to the embodiment, were able to realize the stable reproduction of the pit signals, the stable reproduction of the wobble signals, and the stable recording and reproducing in the wobbling groove.

Here, an optical disc was manufactured using a master where the pattern 80 of a shallow wobbling groove was exposed independently with a thin diameter of a spot only using the 2-1 exposure beam 61 as a comparative example, and evaluation thereof was performed. Consequently, the cross section of the wobbling groove of the master had a shallow V-shaped form and the width of a bottom thereof was almost 0, because the shallow groove was exposed to single narrow beam. In the optical recording medium having the above wobbling groove, the aperture width of the wobbling groove was about 320 nm, but the bottom width was 0 nm substantially, so it was impossible to obtain a sufficient amount of signals.

In addition, when the depth of the wobbling groove was 30 nm or less, it was substantially impossible to reproduce the wobble signals. Moreover, when the minimum value of the aperture width of the wobbling groove is 290 nm and the bottom width was 50 nm or more under the specified conditions of the optical pickup as described above, it was confirmed that good reproduction of the wobble signals was possible. Based on this, it is estimated that the bottom width of the wobbling groove is preferably 50 nm or more, and the ratio of the bottom width to the aperture width is preferably set to 17% or more. Needless to say, the details of the wobbling groove were not limited only to this.

In addition, the invention can widely be applied to optical recording media having a format of pits and a wobbling groove with a shallow U-shaped cross section form, and masters which is used for manufacturing thereof. Moreover, any optical recording medium can be in scope of objects of the invention, for example, read-only optical recording media, optical recording media that allow data to be rewritten repeatedly, or optical recording media that allow data to be written once but not to be erased.

Particularly, there is no limit to data recording processes of the optical recording media, and any optical recording medium, for example, read-only optical recording media having pre-recorded data, magneto-optical recording media for recording and reproducing data using magnetooptic effects or phase-change type optical recording media for recording and reproducing data using phase change of a recording layer, can be in scope of objects of the invention.

Moreover, in the invention, the beams to be recombined are not limited only to two or three ones, and four, five, or more beams can be aligned and arranged by installing more PBS.

Further, the latent image of the wobbling groove having certain bottom width can be formed by oscillating single. beam in the radius direction of the master at certain oscillation within certain period to form an artificial (apparent) broad spot in the radius direction of the master.

Moreover, it is applicable not only to optical recording methods or optical recording apparatuses but also to signal recording systems or apparatuses, systems or apparatuses having both the functions, and the like.

As described above, according to the optical recording medium of the invention, the groove is formed so that the groove depth is shallower than that of the pits and the cross section thereof is U-shaped, which produces the effects that sufficient amount of the servo signals or the push-pull signals can be obtained during the reproduction. Moreover, it is possible to control dispersion in the distribution of the depth of the groove, which also produces the effects of securing the uniform record reproducing properties.

Moreover, according to the master of the invention, and the apparatus and method for manufacturing the master for manufacturing optical recording medium of the invention, the optical deflection for wobbling is performed on the single exposure beam supplied from the light source, the beam is divided into the plural exposure beams after that, the plural exposure beams are arranged to be aligned at certain widths in the radius direction of the master, the exposure beam with the spot wider in the radius direction of the master than that of the above single exposure beam is irradiated to the master in order to expose the latent image for forming the groove with the U-shaped cross section on the master, and the latent image is developed to obtain the master having the original form of the groove with the U-shaped cross section. This produces the effects that the groove of the optical recording medium, which is manufactured using the master, is shallow with the U-shaped cross section having the flat bottom with certain width.

Moreover, the optical deflection for wobbling is performed on the single exposure beam supplied from the light source, the beam is divided into the plural exposure beams after that, the plural exposure beams are arranged and aligned at certain widths in the radius direction of the master to form the exposure beam with the wider spot in the radius direction of the master. Thus, the shallow wobbling groove having the U-shaped cross section, and the flat bottom with certain width can surely be formed with ease without producing various disadvantages, for example, phase shifts of the plural exposure beams, interference during the final irradiation of the master, and disordered wobbles due to differing polarizing conditions for the wobbling in these exposure beams. And realizing such shallow wobbling groove having the bottom with certain width can accomplish more improvement in recording density.

Obviously many modifications and variations of the present invention are possible in the light of the above teachings. It is therefore to be understood that within the scope of the appended claims the invention may be practiced otherwise than as specifically described.

The invention claimed is:

1. An optical recording medium comprising:
   a substrate having a groove and plural pits formed and arranged dispersedly in a circumference direction thereon,
   wherein the groove is formed to have a U-shaped cross section which is shallower than a depth of the pits, said U-shaped cross section having an open end opposite a bottom including a flat area, the U-shaped cross section being separated by two opposing sides that taper inwardly, each opposing side having a first portion tapering at a first angle from the open end toward a transition point, and a second portion tapering at a second angle from the transition point toward the bottom, the second angle being smaller than the first angle, said two opposing sides being spaced apart by said bottom so as not to converge, and the groove of the optical recording medium has a ratio of a bottom width to an aperture width in the U-shaped groove to be set to 17% or more.

2. An optical recording medium according to claim 1, wherein the groove is a wobbling groove which is formed to have a wobbled tracking.

3. An optical recording medium according to claim 2, wherein the groove is formed to have the U-shaped cross section by using plural optical axes of plural beams to impact the medium.

4. An optical recording medium according to claim 1, wherein the groove is formed to have the U-shaped cross section by using plural optical axes of plural beams to impact the medium.

5. A master for manufacturing optical recording medium comprising:
   a substrate having a groove and plural pits formed and arranged dispersedly in a circumference direction formed thereon,
   wherein the groove of the optical recording medium is formed to have a U-shaped cross section which is shallower than a depth of the pits, said U-shaped cross section having an open end opposite a bottom including a flat area, the U-shaped cross section being separated by two opposing sides that taper inwardly, each opposing side having a first portion tapering at a first angle from the open end toward a transition point, and a second portion tapering at a second angle from the transition point toward the bottom, the second angle being smaller than the first angle, said two opposing sides being spaced apart by said bottom so as not to converge, and the groove of the optical recording medium has a ratio of a bottom width to an aperture width in the U-shaped groove to be set to 17% or more.

6. A master for manufacturing optical recording medium according to claim 5, wherein the groove is a wobbling groove which is formed to have a wobbled tracking.

7. A master for manufacturing optical recording medium according to claim 6, wherein the groove is formed to have the U-shaped cross section by using plural optical axes of plural beams to impact the medium.

8. A master for manufacturing optical recording medium according to claim 5, wherein the groove is formed to have the U-shaped cross section by using plural optical axes of plural beams to impact the medium.

* * * * *